(12) United States Patent
Mizuno et al.

(10) Patent No.: US 8,587,694 B2
(45) Date of Patent: Nov. 19, 2013

(54) IMAGING APPARATUS, IMAGING METHOD AND COMPUTER-READABLE RECORDING MEDIUM STORING IMAGING PROGRAM WHICH STORE FRAME IMAGE DATA SUCH THAT A THINNING RATE IS HIGHER FOR OLDER FRAME IMAGE DATA

(75) Inventors: Kimiyasu Mizuno, Akishima (JP); Koki Dobashi, Musashino (JP); Jun Muraki, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 618 days.

(21) Appl. No.: 12/404,492

(22) Filed: Mar. 16, 2009

(65) Prior Publication Data

US 2009/0237527 A1 Sep. 24, 2009

(30) Foreign Application Priority Data

Mar. 18, 2008 (JP) ................................. 2008-069627

(51) Int. Cl.
*H04N 5/76* (2006.01)
(52) U.S. Cl.
USPC ............. 348/231.2; 348/231.14; 348/231.9; 348/231.3
(58) Field of Classification Search
USPC ............................. 348/231.2, 231.1–231.99
See application file for complete search history.

(56) References Cited

U.S. PATENT DOCUMENTS

| | | | |
|---|---|---|---|
| 6,597,394 B1 * | 7/2003 | Duncan et al. | 348/222.1 |
| 6,697,568 B1 * | 2/2004 | Kaku | 386/228 |
| 6,977,673 B1 * | 12/2005 | McKain et al. | 348/207.99 |
| 7,787,026 B1 * | 8/2010 | Flory et al. | 348/231.99 |
| 7,804,529 B2 * | 9/2010 | Kijima | 348/231.99 |
| 8,269,837 B2 * | 9/2012 | Shirakawa et al. | 348/207.99 |
| 8,373,770 B2 * | 2/2013 | Hosokawa | 348/231.1 |
| 2004/0119840 A1 * | 6/2004 | Ishihara et al. | 348/222.1 |
| 2005/0074171 A1 * | 4/2005 | Higashijima et al. | 382/232 |
| 2005/0078197 A1 * | 4/2005 | Gonzalez | 348/231.99 |

(Continued)

FOREIGN PATENT DOCUMENTS

| | | | |
|---|---|---|---|
| JP | 2003-244619 A | 8/2003 | |
| JP | 2004-304418 A | 10/2004 | |
| JP | 2005-080226 A | 3/2005 | |
| JP | 2006-311387 | 11/2006 | |

OTHER PUBLICATIONS

Japanese Office Action dated Jan. 12, 2010 and English translation thereof issued in counterpart Japanese Application No. 2008-069627.

(Continued)

*Primary Examiner* — Chia-Wei A Chen
(74) *Attorney, Agent, or Firm* — Holtz, Holtz, Goodman & Chick, PC

(57) ABSTRACT

An image data imaged consecutively is divided into three groups in time series. As for a first group imaged most newly, all imaged image data are held in buffers. The image data of a second group is divided again into subgroups at every $2^N$ images. In the second group, the number of pieces of image data to be recorded in a certain subgroup is twice the number of pieces of image data held in the buffer in the subgroup imaged in the past adjoining the certain subgroup. In a third group, the image data having been held in the buffer included in the subgroup imaged in the earliest in the second group will be all held in the buffer.

6 Claims, 12 Drawing Sheets

(RECTANGULAR HEAD DRAWN BY CONTINUOUS LINE: IMAGE DATA TO BE RECORDED, RECTANGULAR HEAD DRAWN BY WAVY LINE WITH MARK X : IMAGE DATA TO BE DELETED)

(56) References Cited

U.S. PATENT DOCUMENTS

| | | | | |
|---|---|---|---|---|
| 2005/0104993 | A1* | 5/2005 | Matsumoto | 348/345 |
| 2006/0244769 | A1 | 11/2006 | Kudo et al. | |
| 2007/0116450 | A1* | 5/2007 | Kijima | 396/111 |
| 2008/0084485 | A1* | 4/2008 | Aizawa et al. | 348/231.9 |
| 2008/0198243 | A1* | 8/2008 | Kijima | 348/231.99 |
| 2008/0253330 | A1* | 10/2008 | Bartlett | 370/331 |
| 2009/0231466 | A1* | 9/2009 | Morgan et al. | 348/231.1 |

OTHER PUBLICATIONS

Japanese Office Action dated Apr. 20, 2010 and English translation thereof in counterpart Japanese Application No. 2008-069627.

* cited by examiner

FIG.8

| IMAGE DATA NUMBER | NUMBER OF DELETION-OBJECT BUFFER COUNTER | COUNTER 0 | COUNTER 1 | COUNTER 2 | COUNTER 3 | COUNTER 4 | COUNTER 5 | COUNTER 6 | COUNTER 7 | COUNTER 8 | COUNTER 9 | COUNTER 10 | COUNTER 11 | COUNTER 12 | COUNTER 13 | COUNTER 14 | COUNTER 15 | COUNTER 16 |
|---|---|---|---|---|---|---|---|---|---|---|---|---|---|---|---|---|---|---|
| 0 |  | 0 | 0 | 0 | 0 | 0 | 0 | 0 | 0 | 0 | 0 | 0 | 0 | 0 | 0 | 0 | 0 | 0 |
| 1 | (24) | 33 | 0 | 0 | 0 | 0 | 0 | 0 | 0 | 0 | 0 | 0 | 0 | 0 | 0 | 0 | 0 | 0 |
| 2 | (16) | 32 | 33 | 0 | 0 | 0 | 0 | 0 | 0 | 0 | 0 | 0 | 0 | 0 | 0 | 0 | 0 | 0 |
| 3 | (24) | 31 | 32 | 33 | 0 | 0 | 0 | 0 | 0 | 0 | 0 | 0 | 0 | 0 | 0 | 0 | 0 | 0 |
| 4 | (0) | 30 | 31 | 32 | 33 | 0 | 0 | 0 | 0 | 0 | 0 | 0 | 0 | 0 | 0 | 0 | 0 | 0 |
| 5 | (24) | 29 | 30 | 31 | 32 | 33 | 0 | 0 | 0 | 0 | 0 | 0 | 0 | 0 | 0 | 0 | 0 | 0 |
| 6 | (16) | 28 | 29 | 30 | 31 | 32 | 33 | 0 | 0 | 0 | 0 | 0 | 0 | 0 | 0 | 0 | 0 | 0 |
| 7 | (24) | 27 | 28 | 29 | 30 | 31 | 32 | 33 | 0 | 0 | 0 | 0 | 0 | 0 | 0 | 0 | 0 | 0 |
| 8 | (0) | 26 | 27 | 28 | 29 | 30 | 31 | 32 | 33 | 0 | 0 | 0 | 0 | 0 | 0 | 0 | 0 | 0 |
| 9 | (24) | 25 | 26 | 27 | 28 | 29 | 30 | 31 | 32 | 33 | 0 | 0 | 0 | 0 | 0 | 0 | 0 | 0 |
| 10 | (16) | 24 | 25 | 26 | 27 | 28 | 29 | 30 | 31 | 32 | 33 | 0 | 0 | 0 | 0 | 0 | 0 | 0 |
| 11 | (24) | 23 | (33) | 25 | 26 | 27 | 28 | 29 | 30 | 31 | 32 | 0 | 0 | 0 | 0 | 0 | 0 | 0 |
| 12 | (0) | 22 | 32 | 24 | 25 | 26 | 27 | 28 | 29 | 30 | 31 | 33 | 0 | 0 | 0 | 0 | 0 | 0 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 31 | (24) | 29 | 13 | 5 | 32 | (33) | 17 | 9 | 19 | 28 | 21 | 23 | 25 | 27 | 31 | 26 | 30 | 0 |
| 32 | (0) | 28 | 12 | 4 | 31 | 32 | 16 | 8 | 18 | 27 | 20 | 22 | 24 | 26 | 30 | 25 | 29 | 33 |
| (33) | (24) | 27 | 11 | 3 | 30 | 31 | 15 | 7 | 17 | 26 | 19 | 21 | 23 | 25 | 29 | (33) | 28 | 32 |

IMAGING APPARATUS, IMAGING METHOD AND COMPUTER-READABLE RECORDING MEDIUM STORING IMAGING PROGRAM WHICH STORE FRAME IMAGE DATA SUCH THAT A THINNING RATE IS HIGHER FOR OLDER FRAME IMAGE DATA

BACKGROUND OF THE INVENTION

1. Field of the Invention

The present invention relates to an imaging apparatus which images image data, an imaging method and a recording medium with an imaging program recorded thereon.

2. Description of the Related Art

There has been known a camera that stores imaged image data one by one in a buffer, and reads out a plurality of pieces of consecutively-imaged image data from the buffer when there is a change in the image or audio, and records in a recording media (refer to Unexamined Japanese Patent Application KOKAI Publication No. 2004-304418, for example). This camera can record, in the recording medium, the consecutively-imaged image data including the image data imaged by going back to the past from a time point when the existence of the change of the image or audio has been detected (the time point is called a trigger detection moment, henceforth).

Since this camera sets up a thinning pattern of the image data in advance corresponding to a time interval from the trigger detection moment, and determines a ratio at which the imaged image data is thinned and recorded by this thinning pattern, the camera can reduce the total amount of the image data to be recorded in the recording medium, and therewith, can record the image data at the trigger detection moment which has high possibility of having a decisive moment recorded, with the quality thereof maintained.

However, the camera described in Unexamined Japanese Patent Application KOKAI Publication No. 2004-304418, performs thinning after once having stored in the buffer all the image data imaged before the trigger detection moment, and makes the thinned image data be recorded in the recording medium finally. That is, the camera performs thinning of the image data after having stored all the image data in the buffer until the maximum long time in which the storing is possible. Therefore though the image data made to be recorded in the recording medium finally is the image data after being thinned, the storage capacity corresponding to the image data before thinning, that is, all the image data obtained by imaging for a predetermined time was required for the capacity of the buffer. That is, there was a problem that the capacity of the buffer had to be set up greater than the capacity of the image data to be finally made to be recorded.

SUMMARY OF THE INVENTION

An aspect of the present invention is an imaging apparatus that comprises:

an imaging unit that images a plurality of pieces of image data consecutively;

a holding unit that holds the plurality of pieces of image data imaged by the imaging unit for a maximum of a predetermined holding time, while associating a piece of predetermined imaging number information with each of the plurality of pieces of image data;

an updating unit that updates the imaging number information associated with each of the pieces of image data currently held in the holding unit, every time the image data is imaged by the imaging unit;

a deleting unit that deletes a piece of image data and a piece of imaging number information associated with the image data that are currently held in the holding unit, based on the imaging number information having been updated by the updating unit, before elapse of the predetermined holding, time; and a storing unit that stores, in the holding unit, a newest piece of image data and a piece of imaging number information indicating that the image data is newest, in association with each other, in place of the image data and the imaging number information deleted by the deleting unit, wherein the imaging number information corresponds to a number of pieces of the image data imaged in a period that is after each of the pieces of image data has been imaged by the imaging unit and until the newest image data is imaged.

Another aspect of the present invention is an imaging method that comprising the steps of:

holding, by the holding unit, the plurality of pieces of image data imaged by the imaging unit for a maximum of a predetermined holding time while associating each of the plurality of pieces of image data with a piece of imaging number information corresponding to the number of pieces of image data imaged in the period that is after each of the pieces of image data has been imaged by the imaging unit and until the newest piece of image data is imaged;

updating, by an updating unit, the imaging number information associated with each of the plurality of pieces of image data currently held in the holding unit, every time the image data is imaged by the imaging unit;

deleting, by a deleting unit, a piece of image data currently held in the holding unit and the imaging number information associated with the image data before elapse of the predetermined holding time, based on the imaging number information having been updated by the updating unit; and storing in the holding unit, by a storing unit, a newest piece of image data and a piece of imaging number information indicating that the image data is the newest, in association with each other, in place of the image data and the imaging number information deleted by the deleting unit.

Another aspect of the present invention is a computer-readable recording medium storing an imaging program recorded thereon, wherein the computer-readable imaging program makes a computer execute the procedures that comprises:

holding, by the holding unit, the plurality of pieces of image data imaged by the imaging unit for a maximum of a predetermined holding time while associating each of the plurality of pieces of image data with a piece of imaging number information corresponding to the number of pieces of image data imaged in the period that is after each of the pieces of image data has been imaged by the imaging unit and until the newest piece of image data is imaged;

updating, by an updating unit, the imaging number information associated with each of the plurality of pieces of image data currently held in the holding unit, every time the image data is imaged by the imaging unit;

deleting, by a deleting unit, a piece of image data currently held in the holding unit and the imaging number information associated with the image data before elapse of the predetermined holding time, based on the imaging number information having been updated by the updating unit; and storing in the holding unit, by a storing unit, a newest piece of image data and a piece of imaging number information indicating that the image data is the newest, in association with each other, in place of the image data and the imaging number information deleted by the deleting unit.

BRIEF DESCRIPTION OF THE DRAWINGS

These objects and other objects and advantages of the present invention will become more apparent upon reading of the following detailed description and the accompanying drawings in which:

FIG. 8 illustrates an example of values of counters 0 to 16 which change as the image data are imaged according to the first embodiment of the present invention;

DETAILED DESCRIPTION OF THE PREFERRED EMBODIMENTS

First Embodiment

Figure 1:
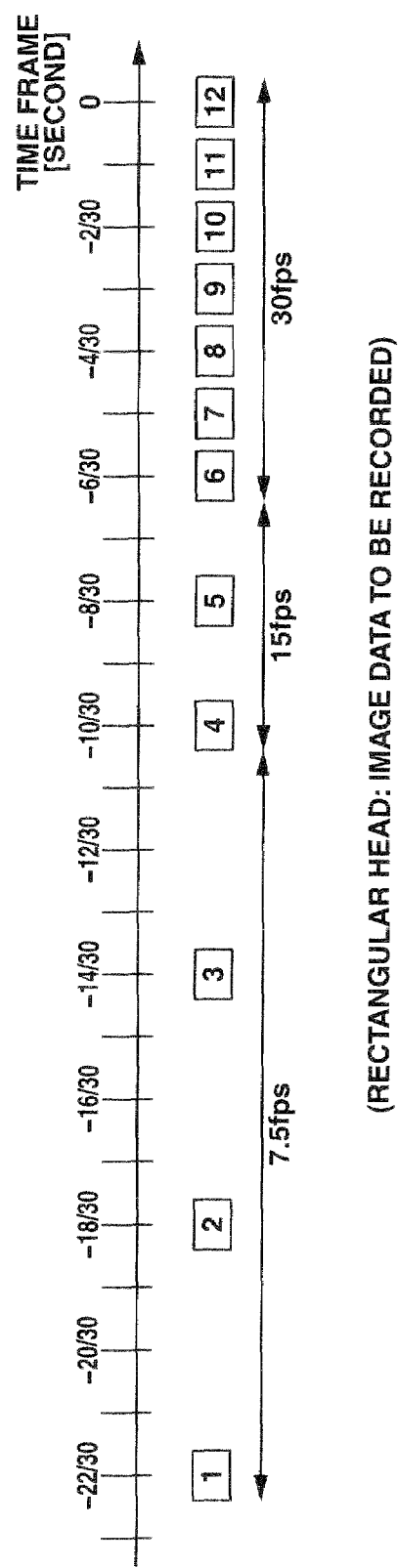
FIG. 1 illustrates an example of a thinning continuous-imaging according to a first embodiment of the present invention.

In imaging of an image data according to a first embodiment of the present invention, a plurality of pieces of image data are imaged consecutively as illustrated in FIG. 1 and the imaged image data are thinned and recorded so that a frame rate may become lower as it goes back to the past. In the following, this is called a thinning continuous-imaging.

For example, FIG. 1 shows an example of the thinning continuous-imaging in the case of imaging 23 pieces of image data at a frame rate of 30 fps (Frame per Second) with a camera and recording 12 pieces of image data thereof. 30 fps means imaging the image data at intervals of 1/30 seconds. In other words, it means imaging 30 pieces of image data per second. In FIG. 1, one rectangular head indicates the image data corresponding to a single piece of the image data, the right-hand side thereof corresponds to the future and the left-hand side thereof corresponds to the past. The image data to which the number 12 has been given is what has been imaged most newly. The image data to which the number 1 has been given is what was imaged in the earliest.

In FIG. 1, as for the newest 7 pieces of image data in time series, all 7 pieces of imaged image data are recorded. In this case, the frame rate is 30 fps. As for 4 pieces of image data in the middle, a single piece of the image data is thinned in every 2 pieces of image data and the remainders are recorded. That is, a single piece of the image data is recorded in every 2 pieces of image data. The ratio at which the image data is recorded is ½. The frame rate in this case is 15 fps. As for the oldest 12 pieces of image data, 3 pieces of image data are thinned and one image data is recorded in every 4 pieces of image data. That is, a single piece of the image data is recorded in every 4 pieces of image data. The ratio at which the image data is recorded is ¼. The frame rate in this case is 7.5 fps. 12 pieces of image data are recorded in all.

Figure 2:
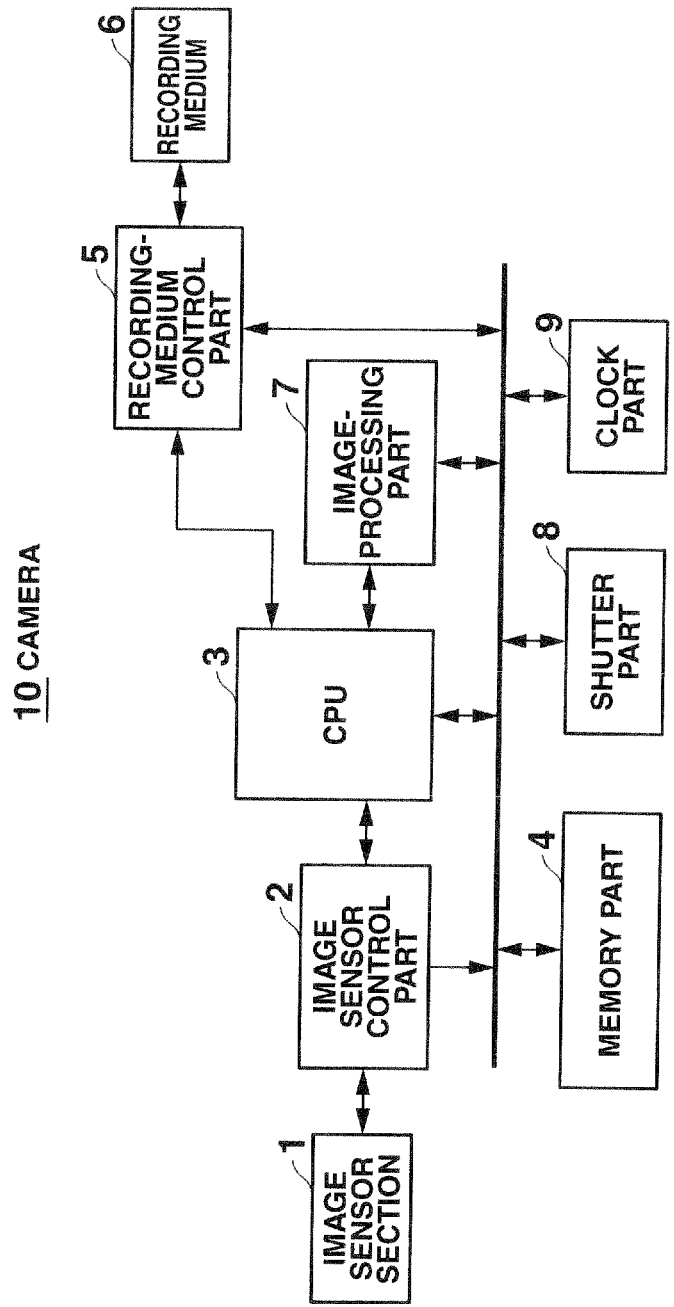
FIG. 2 is a block diagram of a camera according to an embodiment of the present invention.

A camera 10 according to an embodiment of the present invention comprises, as illustrated in FIG. 2, an image sensor section 1, an image sensor control part 2, CPU (Central Processing Unit) 3, a memory part 4, a recording-medium control part 5, a recording medium 6, an image-processing part 7, a shutter part 8, and a clock part 9.

The image sensor section 1 includes an imaging element such as a CCD (Charge Coupled Device) and a CMOS (Complementary Metal Oxide Semiconductor) image sensor, and images the image data. The image sensor control part 2 controls the image sensor section 1 in accordance with an instruction from the CPU 3. The image sensor control part 2 reads the imaged image data from the image sensor section 1, and stores it in the memory part 4.

The CPU 3 is a programmable processor. The CPU 3 controls the overall camera 10. The CPU 3 instructs an imaging start and an imaging completion to the image sensor control part 2, and instructs a storage location of the imaging data. In addition, the CPU 3 instructs the recording-medium control part 5 to store data into and read-out data from the recording medium 6. The CPU 3 computes parameters concerning image processing. The CPU 3 sets up an image processing condition including the computed parameters in the image-processing part 7, and instructs the start of the image processing.

The memory part 4 includes a memory, such as a RAM (Random Access Memory), a ROM (Read Only Memory), and a flash memory. The memory part 4 stores the imaged image data, a program, parameters and the like. The memory part 4 functions as a buffer holding the imaged image data.

The recording-medium control part 5 writes data in the recording medium 6, and reads data from the recording medium 6 in accordance with instructions from the CPU 3. The recording medium 6 is a SD (Secure Digital) memory card, a hard disk, a CD (Compact Disc), or a DVD (Digital Versatile Disc), for example. The recording medium 6 records the image data imaged by the thinning continuous-imaging as illustrated in FIG. 1, for example.

The image-processing part 7 performs processing such as a development process, resizing of the image data which the image sensor control part 2 stores, and compression and decompression of the image data based on the JPEG (Joint Photographic Experts Group) standard.

The shutter part 8 includes a shutter key. The CPU 3 judges that the imaging start has been instructed, for example, in the case of that it is detected that the shutter key has changed into a half shutter state. In addition, the CPU 3 judges that the imaging completion has been instructed, for example, when the shutter key has turned from the half shutter state into a full-pressed state.

The clock part 9 clocks the current time. The CPU 3 acquires the current time from the clock part 9 and when recording the image data in the recording medium 6, for example, the CPU 3 records the date and time at which the image data have been imaged together with the image data.

In addition, the image sensor section 1 and the image sensor control part 2 are examples of an imaging, device of the present invention, the memory part 4 is an example of a holding device of the present invention, and the CPU 3 is an example of an updating device, a deleting device, a storing device, a selecting device, an image number information acquisition device, an initial value calculating device, an imaging control device, and a recording control device of the present invention, the shutter part 8 is an example of a first detecting device and a second detecting device of the present invention, and the recording medium 6 is an example of a recording medium of the present invention.

Figure 3:
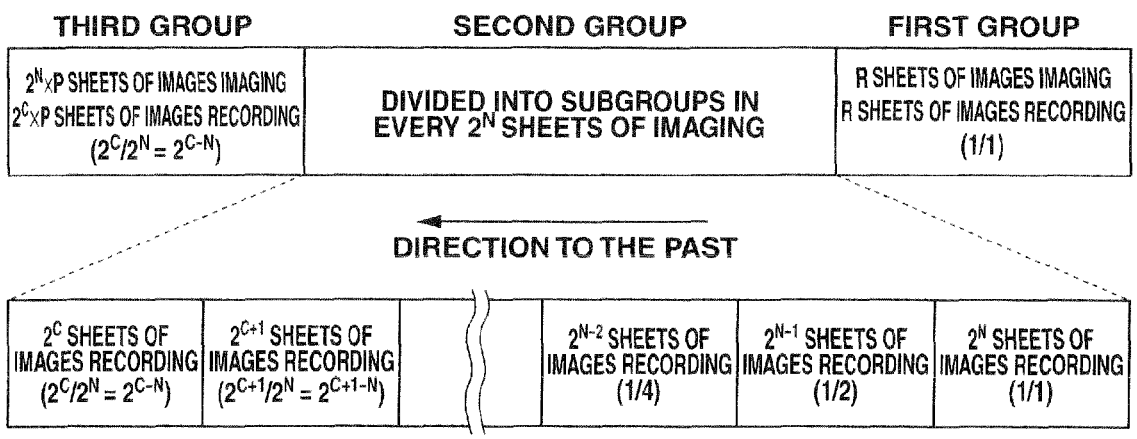
FIG. 3 illustrates dividing of a series of imaged image data according to an embodiment of the present invention.

According to an embodiment of the present invention, as illustrated in FIG. 3, the image data imaged consecutively is divided into three groups in time series.

A first group includes the image data imaged in the time range around the trigger detection moment such as when the shutter key is turned into the full-pressed state, and includes the image data imaged most newly. The trigger detection moment has high possibility of being a decisive moment when an important image has been imaged. Accordingly, the CPU 3 records all the image data included in the first group in the recording medium 6. For example, the CPU 3 records R pieces of images from the imaged R pieces of images, as illustrated in FIG. 3.

On the other hand, the CPU 3 thins the image data imaged in an earlier time range than the trigger detection moment and records them in an image memory.

A second group includes a plurality of pieces of image data having been imaged consecutively just before the image data of the first group is imaged. In the second group, the thinned image data increase as it goes back toward the past. That is, the ratio of the image data to be recorded in the recording medium 6 decreases.

Specifically, the CPU 3 divides again the image data of the second group into subgroups every $2^N$ pieces of images, as illustrated in FIG. 3. A number of pieces of image data to be recorded in the recording medium 6 in one certain subgroup is twice the number of pieces of image data to be recorded in the recording medium 6 in the subgroup which adjoins the certain subgroup and has been imaged in the past thereof and a half of the number of pieces of image data to be recorded in the recording medium 6 in the subgroup which adjoins the certain subgroup and has been imaged in the future thereof.

As illustrated in FIG. 3, in the case of there being (N−C+1) subgroups, the ratio of the number of pieces of image data to be recorded in the recording medium 6 relative to the number of the imaged image data decreases from 1/1 to $2^{C-N}$.

A third group includes a plurality of pieces of having been imaged consecutively just before the image data of the second group is imaged. The ratio of the number of pieces of image data, to be recorded in the recording medium 6 relative to the number of the imaged image data is the same as the ratio in the subgroup imaged in the earliest in the second group. For example, in FIG. 3, the CPU 3 records $2^C \times P$ pieces of image data by the ratio of $2^{C-N}$.

In the embodiment of the present invention, the number of pieces of image data to be recorded M in the recording medium 6 can be expressed with a following equation (1).

[Equation 1]

$$M = \left(\sum_{x=C}^{N} 2^x\right) + R + 2^C \times P \tag{1}$$

Here, N=1, 2, 3, ..., C=0, 1, 2, 3, ..., R=0, 1, 2, 3, ..., P=0, 1, 2, 3, ....

The number of pieces of image data to be recorded of the first group is R.

The number of pieces of image data to be recorded of the second group is $(2^C + 2^{C+1} + \ldots + 2^{N-2} + 2^{N-1} + 2^N)$ pieces. Here, N>C.

The number of pieces of image data to be recorded of the third group is $2^C \times P$ pieces.

In the example of the thinning continuous-imaging illustrated in FIG. 1, the image data to which the number 10 to 12 has been given respectively belongs to the first group, the image data to which the number 3 to 9 has been given respectively belongs to the second group, and the image data to which the number 1 to 2 has been given respectively belongs to the third group. The second group is divided into the subgroup which comprises the image data to which the number 6 to 9 has been given respectively, the subgroup which comprises the image data to which the number 4 to 5 has been given respectively, and the subgroup which comprises only the image data to which the number 3 has been given.

Therefore, in the example of the thinning continuous-imaging illustrated in FIG. 1, N=2, C=0, P=2, and R=3.

Thus, the embodiment according to the present invention can increase arbitrarily the number of pieces of image data where the ratio of the image data to be recorded in the recording medium 6 relative to the number of the imaged image data is highest and in other words, the frame rate of the image data to be recorded in the recording medium 6 is highest, and can increase arbitrarily the number of pieces of image data where the ratio of the image data to be recorded in the recording medium 6 relative to the number of the imaged image data is lowest and in other words, the frame rate of the image data to be recorded in the recording medium 6 is lowest.

Further, in the embodiment of the present invention, as for the image data imaged at the middle time point in time series, the frame rate of the image data to be recorded decreases as it goes back to the past.

Figure 4:
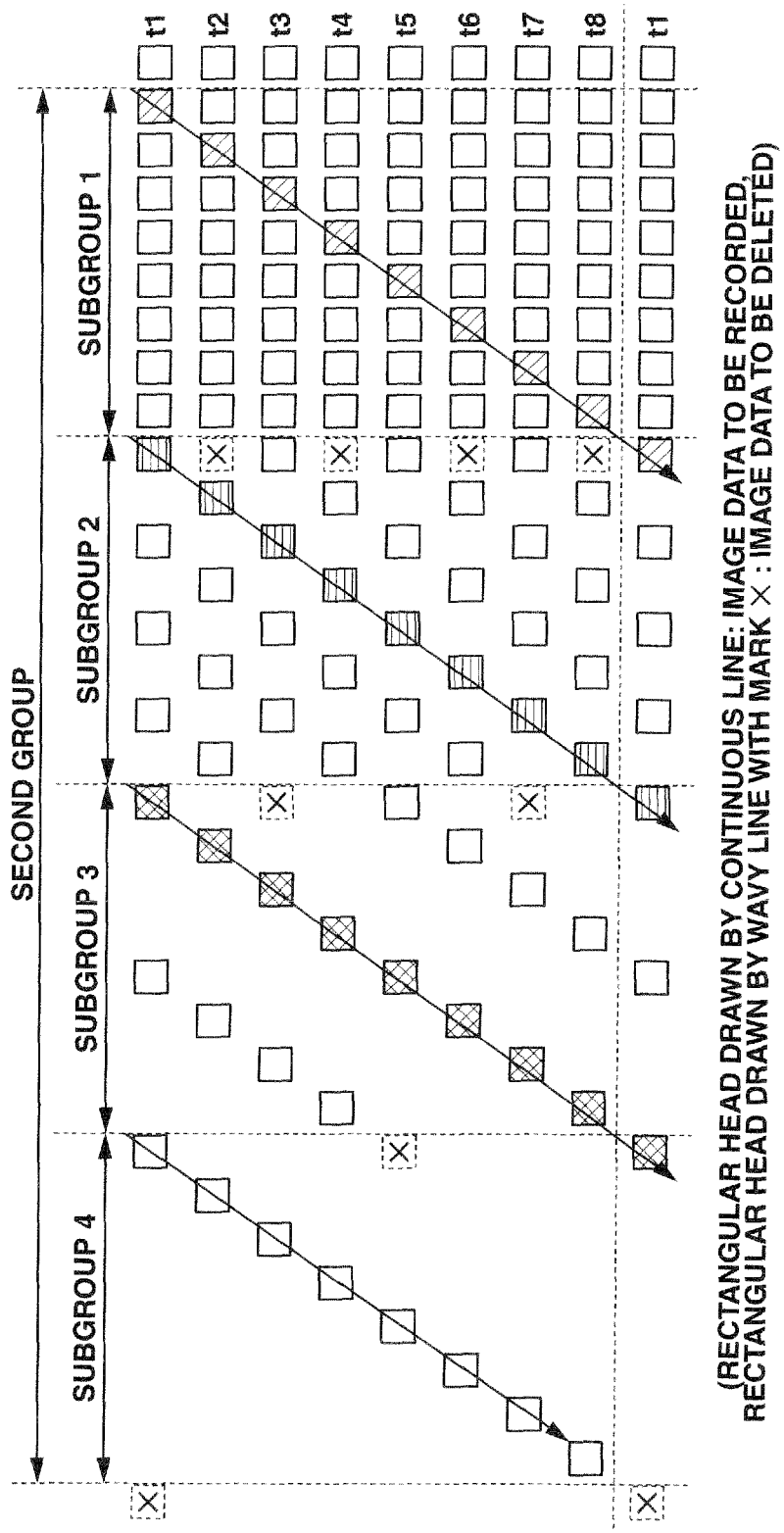
FIG. 4 illustrates an example of timing for deleting the image data according to a first embodiment of the present invention.

FIG. 4 illustrates an example in the case of that N=3, C=0, P=0, and R=1. The first group includes a single piece of the imaged image data. The second group includes the imaged image data of 32 pieces of images and is divided into the subgroups 1 to 4. The image data included in the third group does not exist.

A rectangular head drawn by a continuous line shows a single piece of the image data. In each time corresponding to the time t1 to t8, the right end rectangular head is the image data imaged newly, and the image data is what has been imaged in the earlier as the image is located in the left.

When a piece of new image data is imaged in each time corresponding to the time t1 to t8, each image data moves to the left. Accordingly, when looking at the time t1 to t8 consecutively, each image data moves from the upper right toward the lower left as indicated by an arrow head. The CPU 3 performs the processing to be carried out at the time t1 to t8 repeatedly.

The image data to which a mark x is given in the rectangular head drawn by a wavy line indicates the image data to be deleted.

The subgroup 2 includes 4 pieces of image data. The CPU 3 deletes the data which will belong newly to the subgroup 2 at the time t2, t4, t6, and t8. The subgroup 3 includes 2 pieces of image data. The CPU 3 deletes the image data which will belong newly to the subgroup 3 at the time t3 and t7. The subgroup 4 includes a single piece of the image data. The CPU 3 deletes the image data which will belong newly to the subgroup 4 at the time t5. In addition, the CPU 3 deletes the image data which will belong newly to the third group at the time t1.

Thus, in the embodiment, the CPU 3 deletes a single piece of the image data in each time.

In the embodiment, when the new image data is imaged by the camera 10, the CPU 3 deletes the image data which will belong to the each subgroup newly once for every two times in the subgroup 2 to 4 included in the second group. However, the CPU 3 may merely delete only a single piece of the image data at each time.

In other words, in the embodiment, when the new image data is imaged by the camera 10, the CPU 3 deletes one image data in each subgroup included in the second group whenever two image data moves from the subgroup imaged later in time series to the subgroup imaged earlier in time series with respect to each subgroup excluding the subgroup imaged last in time series.

Thereby, with respect to two subgroups which are included in the second group and are continuous in time series, it is realizable that the number of pieces of image data to be recorded in the recording medium 6 in the subgroup which is later in time series is twice the number of pieces of image data to be recorded in the recording medium 6 in the subgroup which is earlier in time series.

In the equation (1) mentioned above, if N=3, C=1, P=1, and R=1, the number of pieces of image data to be recorded will be M=17. In this case, if the camera 10 images the image data at the frame rate of 60 fps, as for the number of the images imaged by the thinning continuous-imaging, the number of pieces of image data to be recorded at the frame rate corresponding to 60 fps will be 9 (=8+1) pieces, the number of pieces of image data to be recorded at the frame rate corresponding to 30 fps will be 4 pieces, and the number of pieces of image data to be recorded at the frame rate corresponding to 15 fps will be 4 (=2+2) pieces, as illustrated in FIG. 5.

Among these, as for the image data of the first group, the number of pieces of image data to be recorded at the frame rate corresponding to 60 fps is a single piece. As for the image data of the second group, the number of pieces of image data to be recorded at the frame rate corresponding to 60 fps is 8 pieces, the number of pieces of image data to be recorded at the frame rate corresponding to 30 fps is 4 pieces, and the number of pieces of image data to be recorded at the frame rate corresponding to 60 fps is 2 pieces. As for the image data of the third group, the number of pieces of image data to be recorded at the frame rate corresponding to 15 fps is 2 pieces.

In the embodiment, buffers corresponding to the number of pieces of image data to be recorded M is prepared in the memory part 4 for storing the image data. The required buffer capacity will be (the buffer capacity for storing the image data for a single piece of the image data)×(the number of pieces of image data to be recorded M). Since the number of pieces of image data to be recorded is M=17 in the example of FIG. 5, supposing a single piece of the image data stored in the buffer is Bayer data of 8 million pixels, the required storage capacity of the buffer will be 136 million pixels which are calculated by 8 million×17. In the case of 1 byte per pixel, the capacity of the buffer will be 136 million bytes. Thus, according to the embodiment, the required capacity of the buffer can be acquired easily by the calculation above for every applications to which the thinning continuous-imaging is applied.

Figure 5:
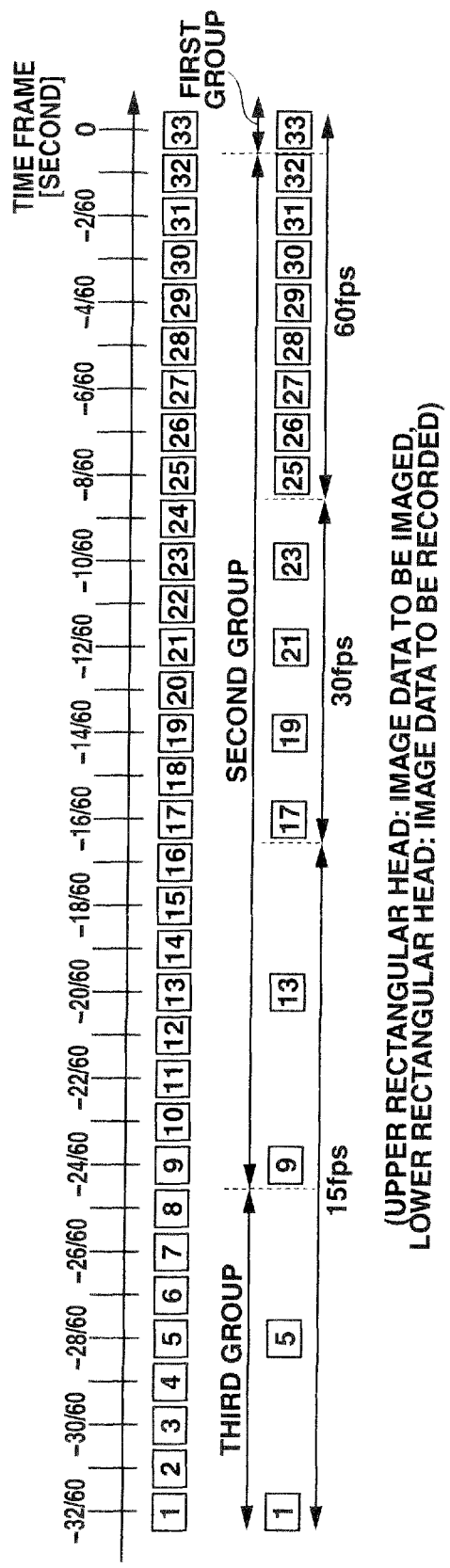
FIG. 5 illustrates an example of the thinning continuous-imaging according to the first embodiment of the present invention.

On the other hand, in the example of FIG. 5, the image data is held until the holding time of (33 pieces of image data×(1/60)=33/60) seconds at the longest passes out. Thus, according to the embodiment, the required capacity of the buffer can be reduced compared with the longest holding time.

In the embodiment, there provided are M counters corresponding, one-to-one, to M buffers for the number of pieces of image data to be recorded. These counters may be provided in the memory part 4, and may be provided as counters for exclusive use separately from the memory part 4.

Each counter operates independently in accordance with the following rule.

(1) Whenever the image data imaged newly is stored in the buffer of the memory part 4, an initial value Vinit shown in the following equation (2) is set in the counter corresponding to the buffer in which the image data thereof has been stored.

(2) Except for the counter of which the value is 0, the each value of the other counters is decremented by 1. However, in the case of the value of the counter being 0 the decrement is not performed.

[Equation 2]

$$V\text{init}=2^N \times (N-C+1+P)+R \quad (2)$$

Here, the meaning of N, C, P, and R is the same as that of the equation (1).

In the example of FIG. 5, the initial value Vinit is 33. The image data imaged in the earliest among the image data having the possibility of being held in the buffer of the memory part 4 is the image data to which the number 1 has been given. The image data imaged most newly is the image data to which the number 33 has been given. The initial value Vinit is the number of pieces of image data actually imaged after the image data 1 was imaged until the image data 33 is imaged.

In the embodiment, since the initial value Vinit is set in the counter, the value of each counter indicates the relative time information with respect to the image data stored in the corresponding buffer, as mentioned later.

In the embodiment, the image data imaged newly is stored in the buffer which has stored the image data to be deleted, illustrated in FIG. 4. However, although the second group includes 4 subgroups in the example of FIG. 4, the second group, in the example of FIG. 5, includes three subgroups. In the example of FIG. 5 the process of the time t1 to the time t3 is performed repeatedly unlike FIG. 4.

The CPU 3 selects repeatedly the buffer which becomes an object for deletion in the order of: the counter corresponding to the buffer storing the image data to be deleted at the time t2, where the value the counter is 24; the counter corresponding to the buffer storing the image data to be deleted at the time t3, where the value the counter is 16; the counter corresponding to the buffer storing the image data to be deleted at the time t4, where the value the counter is 24, and the counter corresponding to the buffer storing the image data to be deleted at the time t1, where the value the counter is 0.

Specifically, in accordance with the "deletion-object buffer selection rule" shown in the following, the CPU 3 selects the buffer in which the image data is made to be the object for deletion (henceforth called a deletion-object buffer) whenever the new image data is imaged. The CPU 3 stores the image data imaged newly in the selected deletion-object buffer. The CPU 3 realizes the thinning continuous-imaging by carrying out this repeatedly.

[Deletion-Object Buffer Selection Rule]

The CPU 3 repeats the selection described in the following (1) to (N−C+1) about the image data imaged consecutively.

Whenever the image data is imaged newly, the CPU 3 inquires into all of the value of M counters, and selects only one of the deletion-object buffer.

(1) The CPU 3 selects the buffer where the value of the counter corresponding thereto is $2^N \times (N-C+P)$ as the deletion-object buffer once in every two times of imaging with the exact period.

(2) The CPU 3 selects the buffer where the value of the counter corresponding thereto is $2^N \times (N-C+P-1)$ as the deletion-object buffer once in every $2^2$ times of imaging with the exact period.

(3) The CPU 3 selects the buffer where the value of the counter corresponding thereto is $2^N \times (N-C+P-2)$ as the deletion-object buffer once in every $2^3$ times of imaging with the exact period.

(N–C–1) The CPU 3 selects the buffer where the value of the counter corresponding thereto is $2^N \times (N-C+P-(N-C-2))$ = $2^N \times (P+2)$ as the deletion-object buffer once in every $2^{N-C+1}$ times of imaging with the exact period.

(N–C) The CPU 3 selects the buffer where the value of the counter corresponding thereto is $2^N \times (N-C+P-(N-C-1))$ = $2^N \times (P+1)$ as the deletion-object buffer once in every $2^{N-C}$ times of imaging with the exact period.

(N–C+1) The CPU 3 selects the buffer where the value of the counter corresponding thereto is 0 as the deletion-object buffer once in every $2^{N-C}$ times of imaging with the exact period.

The meaning of N, C, and P is the same as that of the equation (1) and the equation (2), respectively.

If the deletion-object buffer is selected like this, whenever the image data is imaged newly, one deletion-object buffer will be selected respectively. Accordingly the image data imaged newly can be stored surely in the buffer in the memory part 4. However, the deletion-object buffer may not exist for a while immediately after the start of the thinning continuous-imaging, or until the image data is stored in all the buffers. In that case, the image data imaged newly is stored in the buffer in which the image data has not ever been stored after the start of the thinning continuous-imaging. This detailed description is mentioned later.

Figure 6:
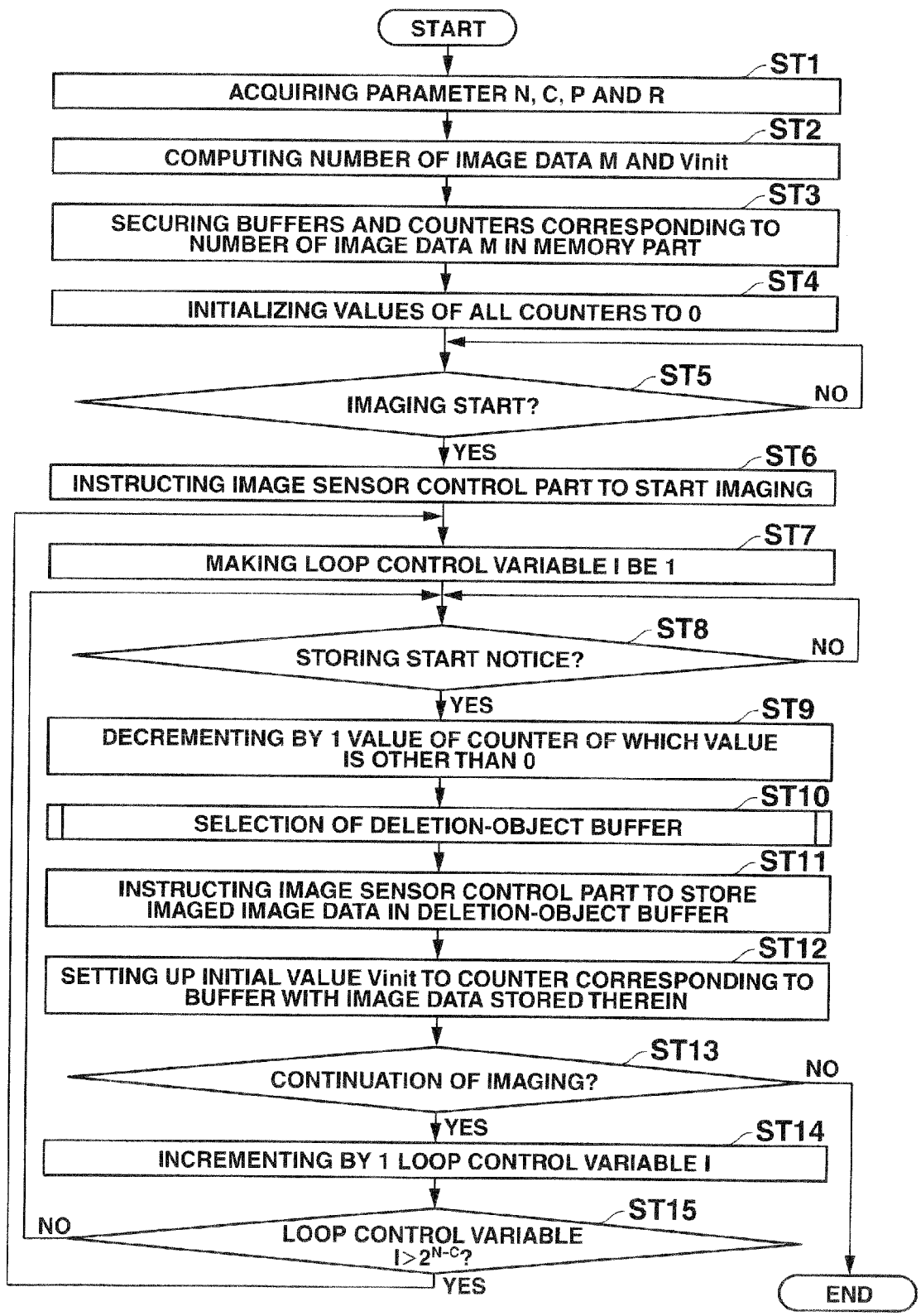
FIG. 6 illustrates a flow chart of a program according to the first embodiment of the present invention.

FIG. 6 illustrates a flow chart of a program according to the first embodiment of the present invention. When the thinning continuous-imaging mode is selected by a mode selection key which is not illustrated, the CPU 3 acquires the parameter R which indicates the number of pieces of image data to be imaged of the first group, the parameter N and the parameter C which determine the number of pieces of image data to be imaged of the second group, and the parameter P which determines the number of pieces of image data to be imaged of the third group (Step ST1).

For example, the CPU 3 acquires the parameter N, the parameter C, the parameter P, and the parameter R, by displaying a list of the longest recording time of the thinning continuous-imaging and the number of pieces of image data to be recorded on the display which is not illustrated and making a user perform the selection thereof. The CPU 3 stores the parameter N, the parameter C, the parameter P, and the parameter R which has been selected by the user in a non-volatile memory such as a flash memory in the memory part 4, and uses the stored value when the thinning continuous-imaging mode is selected again. When the thinning continuous-imaging mode is selected, for example, the CPU 3 acquires the value determined in advance as the parameter N, the parameter C, the parameter P, and the parameter R.

Next the CPU 3 computes the number M and the initial value Vinit of the image data by the above-mentioned equation (1) and equation (2) (Step ST2). Further, the CPU 3 secures, in the memory part 4, the buffers and counters corresponding to the number of pieces of image data to be recorded M in the recording medium 6 (Step ST3). Next, the CPU 3 initializes the values of all the counters to 0 (Step ST4). If the initialization of each counter is completed, the CPU 3 waits for the imaging start (Step ST5; N). The CPU 3 judges it to be the imaging start in the case of that it is detected that the shutter key included in the shutter part 8 has changed into the half shutter state, for example (Step S5; Y). But the decision regarding the imaging start may depend not only on the detection of a half shutter state, but also on any kind of method.

When judging as the imaging start (Step ST5; Y) the CPU 3 instructs the image sensor control part 2 to start the imaging (Step ST6). When receiving the instruction of the imaging start from the CPU 3, the image sensor control part 2 will drive the image sensor section 1, and will start the imaging at a predetermined frame rate. The predetermined frame rate is the same as the highest frame rate in the thinning continuous-imaging. The CPU 3 initializes the loop control variable I to 1 after issuing the imaging start instruction to the image sensor control part 2 (Step ST7). The loop control variable I is used in order to realize the deletion buffer decision rule, and performs counting from 1 to $2^{N-C}$.

The CPU 3 waits for the storing start notice from the image sensor control part 2 (Step ST8). The storing start notice indicates that the preparation where the image sensor section 1 images and stores a single piece of the image data in the buffer of the memory part 4 has been completed. The CPU 3, operating after receiving the storing start notice, performs synchronization with the image sensor control part 2. When receiving the storing start notice (Step ST8; Y), the CPU 3 decrements by 1 the value of each counter of which the value is other than 0 (Step ST9).

The CPU 3 selects, as the deletion-object buffer, the buffer in which the image data to be deleted as shown in FIG. 4 is stored (Step ST10). The specific method of selecting the deletion-object buffer will be mentioned later.

The CPU 3 instructs the image sensor control part 2 to store the image data imaged newly in the selected deletion-object buffer (Step ST11). The image sensor control part 2 stores the image data in the selected deletion-object buffer in accordance with the instruction from the CPU 3.

Next, the CPU 3 sets up the initial value Vinit computed by the above-mentioned equation (2) in the counter corresponding to the buffer in which the image data has been stored (Step ST12).

In the embodiment, each of the value of all the counters in which the image data have been stored is decremented by 1 respectively whenever the new image data is imaged. On the other hand, as mentioned above, the initial value Vinit is the number of pieces of image data imaged actually in the period after the oldest image data was imaged and until the newest image data is imaged. Accordingly, the difference between the initial value Vinit and the value of a certain counter indicates the number of pieces of image data imaged after the image data was stored in the buffer corresponding to the counter thereof.

As a matter of course, the image data stored in the buffer where the value of the corresponding counter thereof is the initial value Vinit is the newest image data within the image data stored in M buffers. As for the other image data, the lapsed time after the image data was stored in the buffer can be calculated by the equation: {Vinit–(the value of the counter)}×the imaging interval. Here, the imaging interval=1/(the frame rate at which the camera 10 performs imaging).

In addition, the image data is held until the value of the counter comes to be 0 at the longest. That is, the image data is held at the longest until the holding time of (Vinit×the imaging interval) will elapse.

Therefore, the value of the counter in the embodiment will be made to serve as the relative time information for the image data imaged most newly with respect to the image data stored in each buffer. Accordingly, in the embodiment, it is not necessary to store the time information about the image data.

After setting up the initial value Vinit of the counter, the CPU 3 judges whether the imaging is in progress or not (Step ST13). The process will be finished if the imaging is not in progress (Step ST13; N). On the other hand, if the imaging is in progress (Step ST13; Y), the CPU 3 will increment by 1 the loop control variable I (Step ST14). As the result, in the case of the loop control variable I being $2^{N-C}$ or less, the process returns to Step ST8 (Step ST15; N). On the other hand, in the case of that the loop control variable I has exceeded $2^{N-C}$, the process returns to Step ST7 (Step ST15; Y), and the loop control variable I is made to be set to 1.

The CPU 3 waits for the storing start notice (Step ST8) again, and Step ST8 to Step ST15 is repeated.

Further, there is a method in which the CPU 3 judges it to be the imaging completion when the state of the shutter becomes a full press state from the half shutter state (Step ST13; N). According to this method, the imaging can be performed by going back to the past, with making the time at which the shutter is pressed fully be as a reference time point.

When detecting the full press of the shutter, the CPU may be made to judge it to be the imaging completion after having imaged the predetermined number of pieces of image data (Step ST13; N). For example, in the case of that the imaging completion is made to be judged when the imaging of R pieces of image data is completed, the image data imaged at the time when the full press of the shutter is detected is made to be the last image data of the second group, and the image data of the first group will be imaged after the time thereof. In this case, the R pieces of image data imaged after the full press of the shutter is detected are all recorded in the recording medium 6.

According to this method, the image data imaged after the shutter full press can be recorded at the highest frame rate. Accordingly, even in the case of that the timing of the shutter full press is somewhat earlier than the decisive moment which an imaging person intends, the possibility that the image data imaged after the shutter full press, which the imaging person intends, will be able to be recorded in the recording medium 6 becomes high.

Figure 7:
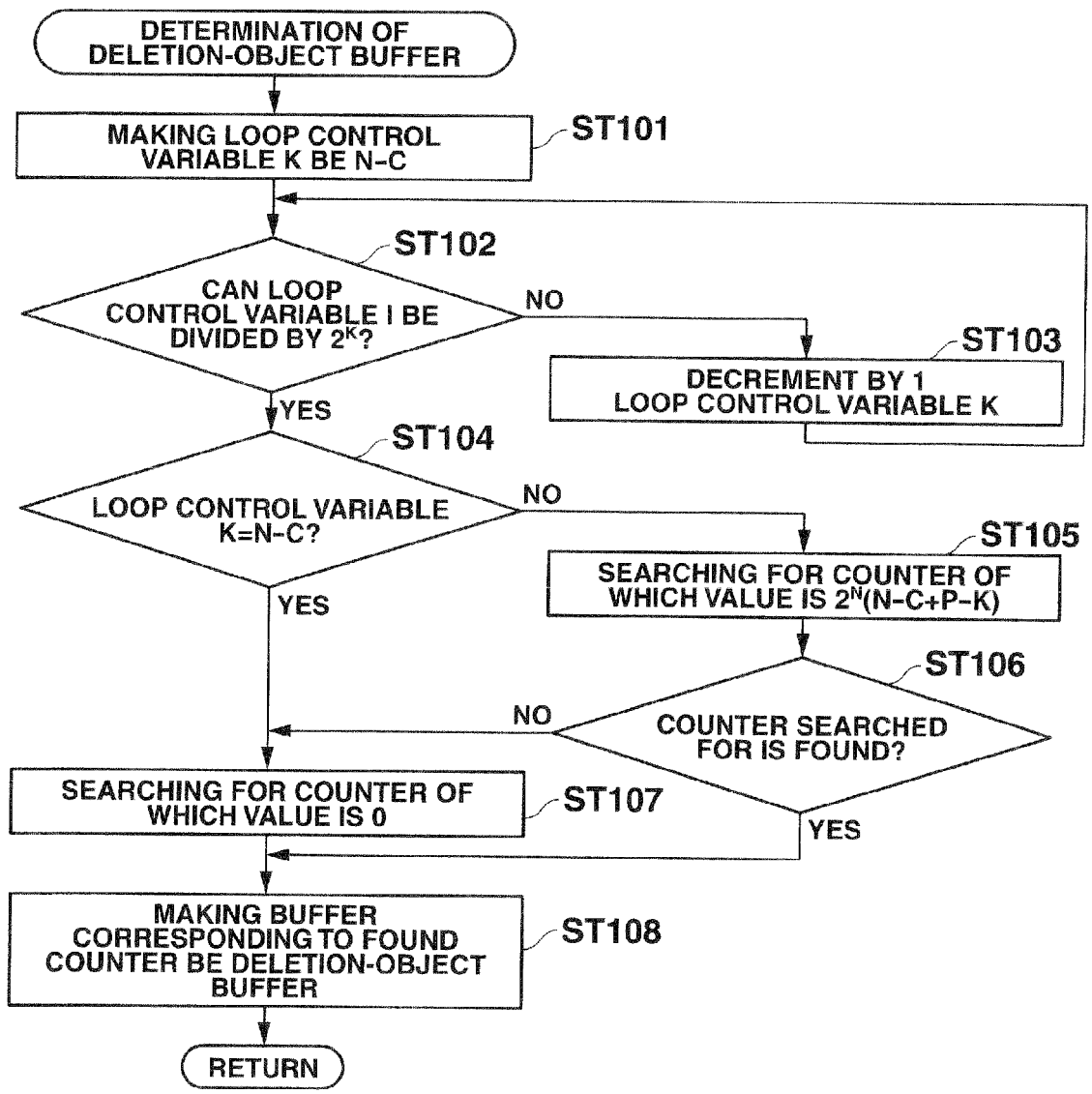
FIG. 7 illustrates a flow chart of a deletion object buffer selecting program according to the first embodiment of the present invention.

When selecting the deletion-object buffer in Step ST10, the CPU 3 initializes a loop control variable K to (N−C), as illustrated in FIG. 7 (Step ST101). Next, the CPU 3 judges whether the loop control variable I can be divided by $2^K$ or not (Step ST102). In the case of that the loop control variable I can not be divided (Step ST102; N), the CPU 3 decrements the loop variable K by 1 until the value which can divide the loop control variable I is found (Step ST103). As for this process, the value which can divide the valuable I is certainly found when K reaches 0 at least. The loop control variable I can be divided by 1 at least because $2^K=2^0=1$.

If the value K which can divide the loop control variable I is found (Step ST102; Y), the CPU 3 judges whether K=N−C or not (Step ST104). In the case of not K=N−C (Step ST104; N), the CPU 3 searches for the counter of which the value is $2^N \times (N-C+P-K)$ (Step ST105).

A corresponding counter may not be found even if the searching is performed in Step ST105 (Step ST106; N). Such a state happens when the image is not stored in all buffers, that is, for a while after the imaging start. In this case, the buffer in which the image has never been stored yet after the imaging start is searched for. In this search the counter of which the value is 0 may be just searched (Step ST107).

In the case of K=(N−C) (Step ST104; Y), the counter of which the value is 0 is searched for (Step ST107).

If the corresponding counter is found with these searches, the buffer corresponding to the counter will be selected as the deletion-object buffer (Step ST108).

For example the case of N=3, C=0, and P=0 is shown in FIG. 4. At this time, the initial value of the loop control variable K is 3 in the process shown in FIG. 7.

In the case of the loop control variable is K=3, the buffer in which the image data to be going to belong to the third group newly have been stored is selected as the deletion-object buffer. In this case, whenever the image data is imaged 8 times, the buffer corresponding to the counter of which the value is 0 is selected as the deletion-object buffer.

In the example shown in FIG. 4, 4 subgroups are included in the second group. In the case of the loop control variable being K=0, the buffer in which the image data to be going to belong to the subgroup 2 newly is stored is selected as the deletion-object buffer. In Step ST105 of FIG. 7, the value of the counter corresponding to K=0 is 24. In this case, whenever the image data is imaged twice, the buffer corresponding to the counter of which the value is 24 is selected as the deletion-object buffer.

In the case of the loop control variable being K=1, the buffer in which the image data to be going to belong to the subgroup 3 newly is stored is selected as the deletion-object buffer. In Step ST105 of FIG. 7, the value of the counter corresponding to K=1 is 16. In this case, whenever the image data is imaged 4 times, the buffer corresponding to the counter of which the value is 16 is selected as the deletion-object buffer.

In the case of the loop control variable being K=2, the buffer in which the image data to be going to belong to the subgroup 4 newly is stored is selected as the deletion-object buffer. In Step ST105 of FIG. 7, the value of the counter corresponding to K=2 is 8. In this case, whenever the image data is imaged 8 times, the buffer corresponding to the counter of which the value is 8 is selected as the deletion-object buffer.

Therefore, in the example of FIG. 4, the value of the counter corresponding to the buffer selected as the deletion-object buffer repeats 24→16→24→8→24→16→24→0.

For example, the case of N=3, C=1, and P=1 is shown in FIG. 5. At this time, in the process shown in FIG. 7, the initial value of the loop control variable K is 2.

In the case of the loop control variable being K=2, the buffer in which the image data belonging to the third group is stored is selected as the deletion-object buffer. In this case, whenever the image data is imaged 4 times, the buffer corresponding to the counter of which the value is 0 is selected as the deletion-object buffer.

In the example of FIG. 5, three subgroups are included in the second group. In the case of the loop control variable being K=0, the buffer in which the image data to be going to belong newly to the subgroup of the middle in time series within the second group is stored is selected as the deletion-object buffer. In Step ST105 of FIG. 7, the value of the counter corresponding to K=0 is 24. In this case, whenever the image data is imaged twice, the buffer corresponding to the counter of which the value is 24 is selected as the deletion-object buffer.

In the case of the loop control variable being K=1, the buffer in which the image data to be going to belong newly to the left subgroup, that is, the oldest subgroup in time series within the second group is stored, is selected as the deletion-object buffer. In Step ST105 of FIG. 7, the value of the counter corresponding to K=1 is 16. In this case, whenever the image data is imaged 4 times, the buffer corresponding to the counter of which the value is 16 is selected as the deletion-object buffer.

Therefore, in the example of FIG. 5, the value of the counter corresponding to the buffer selected as the deletion-object buffer repeats 24→16→24→0.

In the example of FIG. 5, N=3, C=1, P=1, and R=1. In this case, the number of pieces of image data computed by the above-mentioned equation (1) is M=17. Therefore, in the embodiment, the CPU 3 is provided with 17 buffers which are the buffer 0 to 16 respectively, and 17 counters which are the counter 0 to 16 respectively, in the memory part 4.

In the example of FIG. 5, the value of the counter 0 to 16 changes respectively as illustrated in FIG. 8 as the imaging of the image data progresses.

In FIG. 8, the time frame progresses in the downward direction. The image data number 0 indicates a state where the image data has not been imaged. When the image data number is 0, the CPU 3 initializes the counter 0 to 16 to 0 respectively (Step ST4 of FIG. 6).

The image data number 1 indicates the state where a first piece of the image data has been imaged. When receiving the storing start notice from the image sensor control part 2 (Step ST8; Y of FIG. 6), the CPU 3 performs the process shown in FIG. 7, and searches for the buffer corresponding to the counter of which the value is 24 as the deletion-object buffer (Step ST105 of FIG. 7). However, since each of the values of all the counters is 0, the buffer is not found even if the searching is performed. Then, the CPU 3 selects the counter 0 as the deletion-object buffer (Step ST107 and ST108 of FIG. 7). However, since each value of the counter 0 to 16 is 0 respectively, the CPU 3 may select any of the counter 0 to 16. The following is also the same.

As mentioned above, in the example of FIG. 5, the initial value Vinit computed by the equation (2) is 33. The CPU 3 stores the first piece of the image data in the buffer corresponding to the counter 0, and sets the initial value 33 in the counter 0 (Step ST11 and ST12 of FIG. 6).

The image data number 2 indicates the state where a second piece of the image data has been imaged. When receiving the storing start notice from the image sensor control part 2 (Step ST8; Y of FIG. 6), the CPU 3 decrements by 1 the value of each counter of which the value is other than 0 (Step ST9 of FIG. 6). In this case, the value of the counter 0 only is decremented by 1 and becomes to be 32. Subsequently, the CPU 3 performs the process shown in FIG. 7, and searches for the buffer corresponding to the counter of which the value is 16 as the deletion-object buffer (Step ST105 of FIG. 7). However, the counter of which the value is 16 is not found even if the searching is performed. Then, the CPU 3 selects the counter 1 as the deletion-object buffer (Step ST108 of FIG. 7). The CPU 3 stores the second piece of the image data in the buffer corresponding to the counter 1, and sets the initial value 33 in the counter 1 (Step ST11 and ST12 of FIG. 6).

The image data number 3 indicates the state where a third piece of the image data has been imaged. When receiving the storing start notice from the image sensor control part 2 (Step ST8; Y of FIG. 6), the CPU 3 decrements by 1 the value of each counter of which the value is other than 0 (Step ST9 of FIG. 6). In this case, the counter 0 and the counter 1 is decremented respectively by 1 and the each value thereof becomes to be 31 and 32, respectively. Subsequently, the CPU 3 performs the process shown in FIG. 7, and searches for the buffer corresponding to the counter of which the value is 24 as the deletion-object buffer (Step ST105 of FIG. 7). However, the counter of which the value is 24 is not found even if the searching is performed. Then, the CPU 3 selects the counter 2 as the deletion-object buffer (Step ST108 of FIG. 7). The CPU 3 stores the third piece of the image data in the buffer corresponding to the counter 2, and sets the initial value 33 to the counter 2 (Step ST11 and ST12 of FIG. 6).

The image data number 4 indicates the state where a fourth piece of the image data has been imaged. When receiving the storing start notice from the image sensor control part 2 (Step ST8; Y of FIG. 6), the CPU 3 decrements by 1 the value of each counter of which the value is other than 0 (Step ST9 of FIG. 6). In this case, the counter 0 to 2 is decremented respectively by 1 and the each value thereof becomes to be 30, 31 and 32 respectively. Subsequently, the CPU 3 performs the process shown in FIG. 7, and searches for the buffer corresponding to the counter of which the value is 0 (Step ST105 of FIG. 7). The counters 3 to 16 are found respectively as the counter of which the value is 0 respectively (Step ST107 of FIG. 7). Although the CPU 3 may select any of the counters 3 to 16, the CPU 3 is made to select the counter 3 as the deletion-object buffer here (Step ST108 of FIG. 7). The CPU 3 stores the fourth piece of the image data in the buffer corresponding to the counter 3, and sets the initial value 33 in the counter 3 (Step ST11 and ST12 of FIG. 6).

Further, in the case of the imaging being continued, the value of the counter of the buffer selected as the deletion-object buffer repeats 24→16→24→0.

The image data number 11 indicates the state where an eleventh piece of the image data has been imaged. At this time, the CPU 3 stores, for the first time after the imaging start, the imaging data in the buffer of which the counter has the value other than 0. The CPU 3 decrements by 1 each value of the counter 0 to 9, respectively. As the result, the value of the counter 1 becomes to be 24. On the other hand, the CPU 3 performs the process shown in FIG. 7, and searches for the buffer corresponding to the counter of which the value is 24 as the deletion-object buffer (Step ST105 of FIG. 7). As the result, the CPU 3 finds the counter 1 as the counter of which the value is 24 (Step ST107 of FIG. 7). The CPU 3 selects the counter 1 as the deletion-object buffer (Step ST108 of FIG. 7). The CPU 3 stores the eleventh piece of the image data in the buffer corresponding to the counter 1, and sets the initial value 33 in the counter 1 (Step ST11 and ST12 of FIG. 6).

In FIG. 8, the counter having the value 33 enclosed with a mark 0 indicates that the image data imaged newly is stored in the buffer corresponding to this counter.

When the imaging is continued as mentioned above, the state where the image data has been stored in all the buffers, is made to be realized when the image data number is 32. When finishing the imaging in this state, the value of each counter is made to be 28, 12, 4, 31, 32, 16, 8, 18, 27, 20, 22, 24, 26, 30, 25, 29, and 33, in the order of the counter 0 to 16.

When the imaging is finished, the image-processing part 7 performs development processing, picture correction processing, JPEG compression processing and the like, and the CPU 3 controls the recording-medium control part 5, and makes the image data stored in 17 buffers be recorded in the recording medium 6.

In the embodiment, the difference between the initial value Vinit=33 and the value of the counter indicates the number of pieces of image data having been imaged after the image data stored in the buffer corresponding to the counter was stored therein. Thus, the value of the counter indicates relative time information, and therefore the relative relation about the imaging time of the image data stored in each buffer is able to be known. Accordingly, when recording the image data in the recording medium 6, the CPU 3 can align in time series and record the 17 image data obtained by the thinning continuous-imaging. In addition the CPU 3 acquires the current time from the clock part 8, and can record the date and time at which the image data was imaged in association with the image data to be recorded in recording medium 6. Further, the CPU 3 JPEG-compresses the image data in each buffer individually, and can embed in each JPEG header portion the information on the date and time at which the imaging was, performed.

Figure 9:
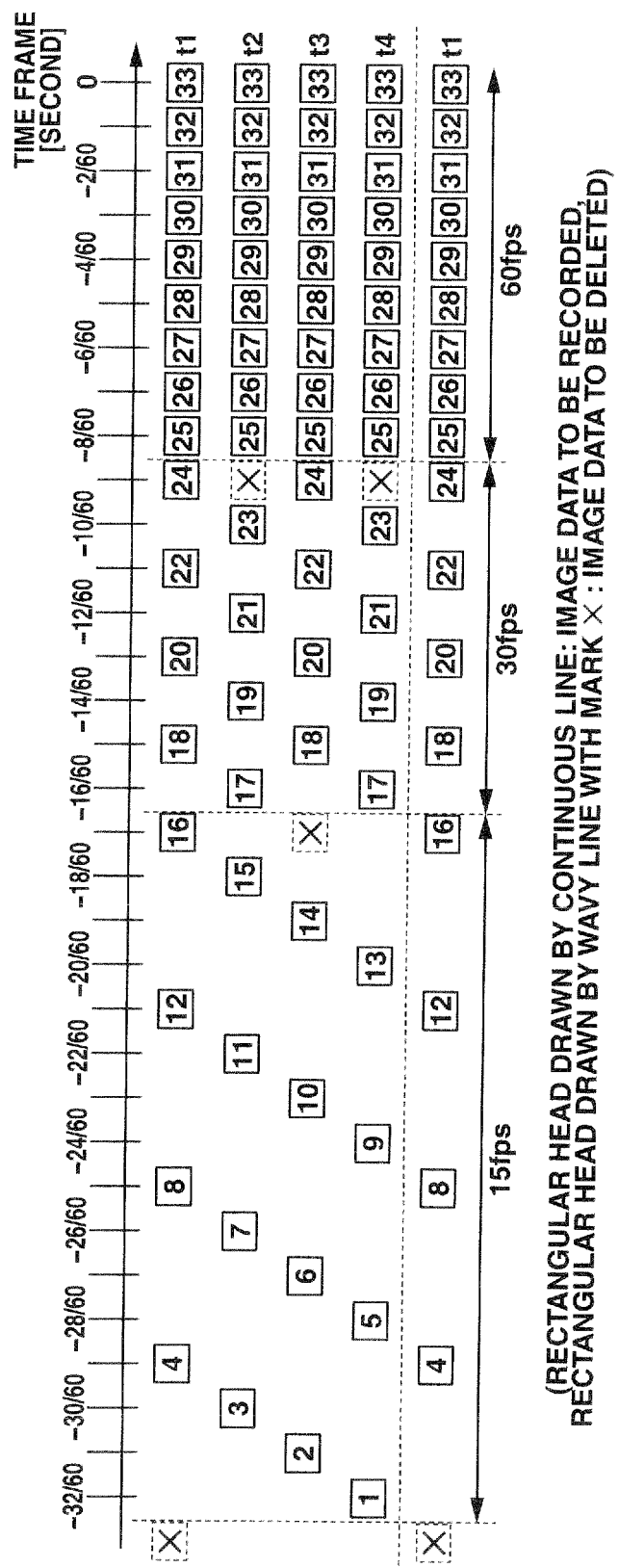
FIG. 9 illustrates a relative relation on time series of the image data which is recorded by the thinning continuous-imaging corresponding to the timing of imaging completion according to the first embodiment of the present invention.

In the embodiment, the time series relative relation of the image data to be recorded in the recording medium 6 differs depending on the timing of the imaging completion as illustrated in FIG. 9. In FIG. 9, the rectangular head drawn by the continuous line indicates the image data to be recorded in the recording medium 6. The rectangular head drawn by the wavy line to which a mark x is given indicates the image data to be deleted.

In the case of the imaging being completed at the time t1, as indicated in the row of the top of FIG. 9, the image data corresponding to the image data number 32 indicated in FIG. 8 is recorded in the recording medium 6. That is, the CPU 3 records the image data imaged at the time corresponding to 28, 12, 4, 31, 32, 16, 8, 18, 27, 20, 22, 24, 26, 30, 25, 29 and 33, each of which is the value of the counter 0 to 16 respectively.

However, each value of the counter 0 to 16 is an example in the case of that the imaging is started from the image data number 1 and that the imaging is completed when the image data corresponding to the image data number 32 is imaged as indicated in FIG. 8. If the number of pieces of image data imaged from the start of the imaging until the completion of the imaging differs, the each value of the counter 0 to 16 will turn into a different value from the each value of the image data corresponding to the image data number 32 indicated in FIG. 8. For example, as for the image data corresponding to the time t1 in the row of the top of FIG. 9 and the image data corresponding to the time t1 in the bottom row, the relative relation on the time series of the image data is the same, but the value of the counter 0 to 16 differs from each other.

Further, in the case of the imaging being completed at the time t2, the image data corresponding to the image data number 33 indicated in FIG. 8 is recorded in the recording medium 6 as indicated in the second row of FIG. 9, for example.

Thus, the relative relation of the recorded image data on the time series comes to change depending on the timing of the imaging completion. However, the relation described in FIG. 3 is maintained. That is, the number of pieces of image data to be recorded of the first group, the second group and the third group which is determined based on the variable N, C, P and R, is kept even if in what timing the imaging may be completed. And the relation of the number of pieces of image data to be imaged between the subgroups included in the second group which is determined based on the variable N, is also kept. That is, the frame rate of the image data to be recorded in a certain subgroup is twice the frame rate in the past subgroup adjoining the certain subgroup, and is a half of the frame rate in the future subgroup adjoining the certain subgroup.

Second Embodiment

Figure 10:
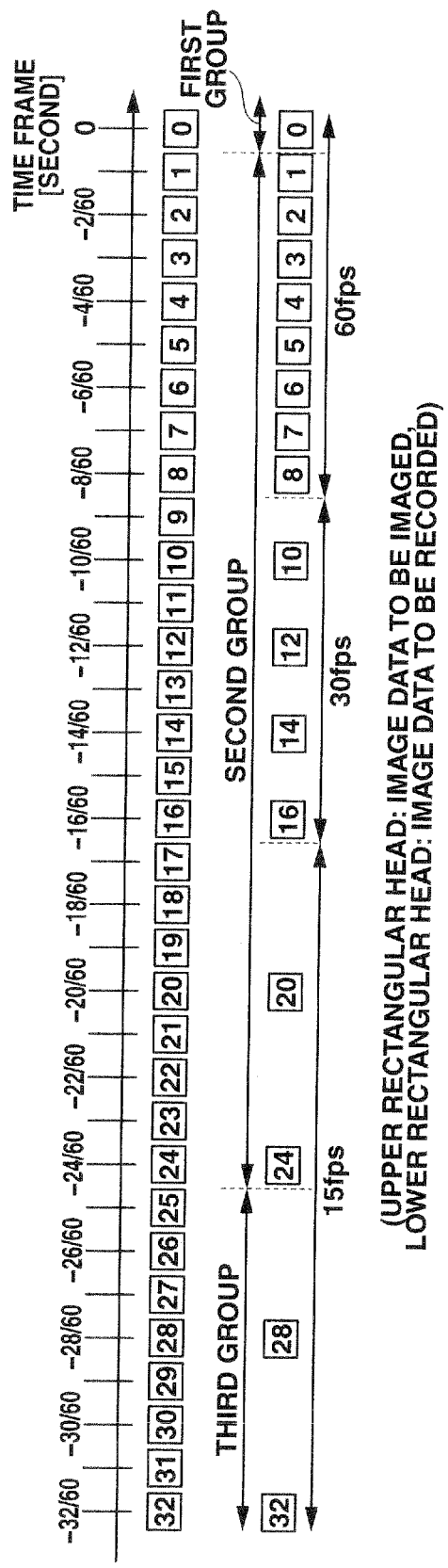
FIG. 10 illustrates an example of a thinning continuous-imaging according to a second embodiment of the present invention.

A thinning continuous-imaging according to a second embodiment of the present invention also images consecutively a plurality of pieces of as is the same as the first embodiment as illustrated in FIG. 10, and thins and records the imaged image data so that a frame rate may become lower as it goes back to the past.

A structure of a camera used in the second embodiment is the same as that of the camera 10 used in the first embodiment as illustrated in FIG. 2. And the division of the series of the imaged image data is also the same as that of the first embodiment illustrated in FIG. 3. The image data to be recorded in the recording medium 6 as a result of the thinning continuous-imaging is also the same between the first embodiment and the second embodiment.

In the first embodiment, a down counter is used as the counter. In the second embodiment, an up counter is used as the counter. That differs from the first embodiment. FIG. 10 is an example of the thinning continuous-imaging in the case of that N=3, C=1, P=1 and R=1 as is the same as FIG. 5 in the first embodiment. The number of pieces of image data to be recorded is M=17. In FIG. 10, the image data to which the number 0 has been given is the image data which has been imaged most newly. FIG. 10 is the same as FIG. 5 except for the point that the image data to which the number 32 has been given is the image data which was imaged in the earliest.

In the embodiment, buffers for storing the image data, corresponding to the number of pieces of image data to be recorded M in the memory part 4, are also prepared. The required buffer capacity will be (the buffer capacity for storing a single piece of the image data)×(the number of pieces of image data to be recorded M). In addition, M counters corresponding, one-to-one, to M buffers for the number of pieces of image data to be recorded are provided. These counters may be provided in the memory part 4, and may be provided separately from the memory part 4 as the counter for exclusive use. M is computed by the equation (1) given in the first embodiment.

Each counter operates independently in accordance with the following rule.

(1) Whenever the image data imaged newly is stored in the buffer of the memory part 4, the initial value 0 is set in the counter corresponding to the buffer in which the image data is stored.

(2) Except for the counter of which the value is Vinit, the other counters are incremented by 1. In the case of the value of the counter being Vinit, the increment thereof is not performed. Here, Vinit is computed by the equation (2) shown in the first embodiment.

In the embodiment, since the initial value 0 is set in the counter, the value of each counter indicates the relative time information with respect to the image data stored in the corresponding buffer.

Figure 11:
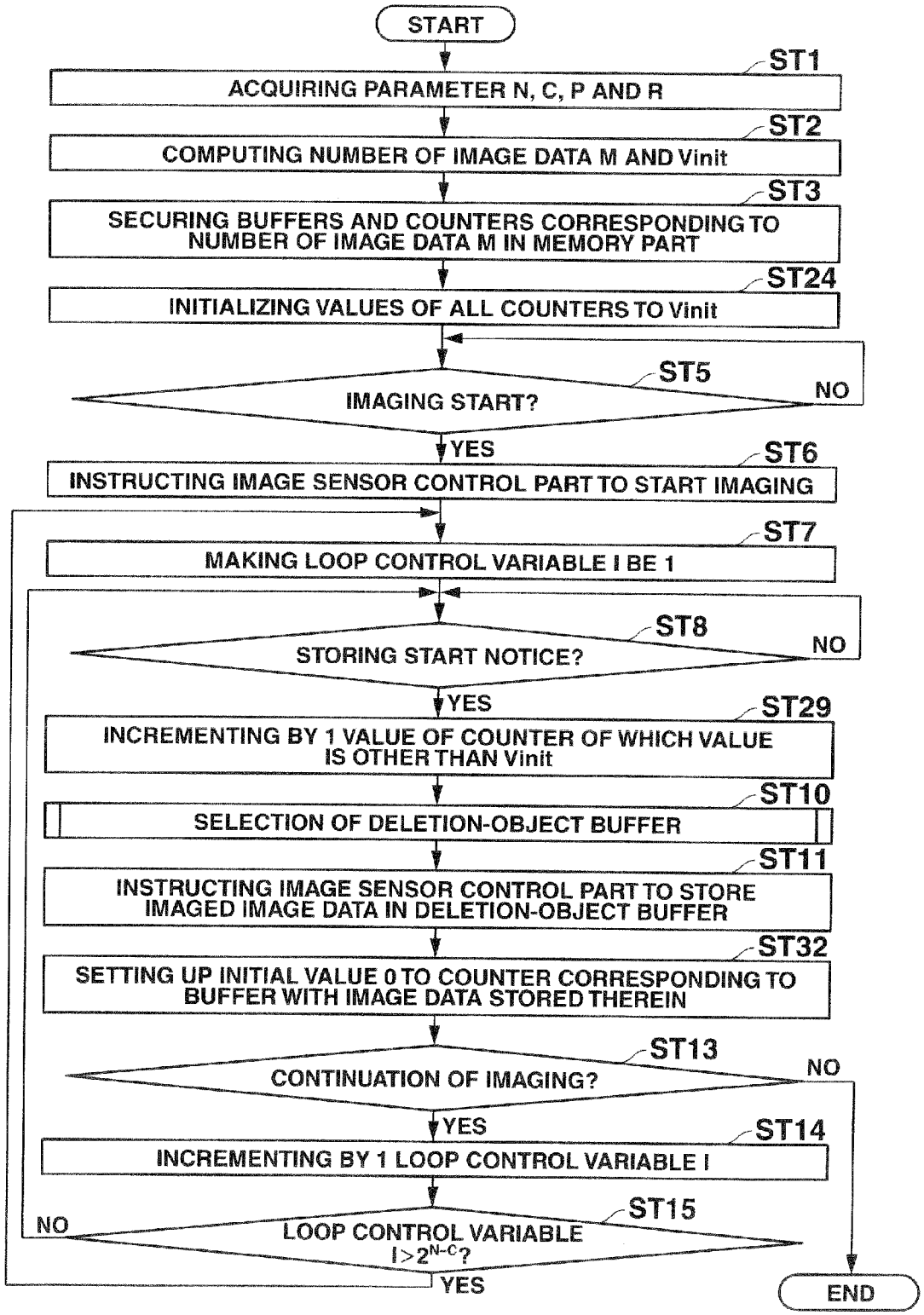
FIG. 11 illustrates a flow chart of a program according to the second embodiment of the present invention.
Figure 12:
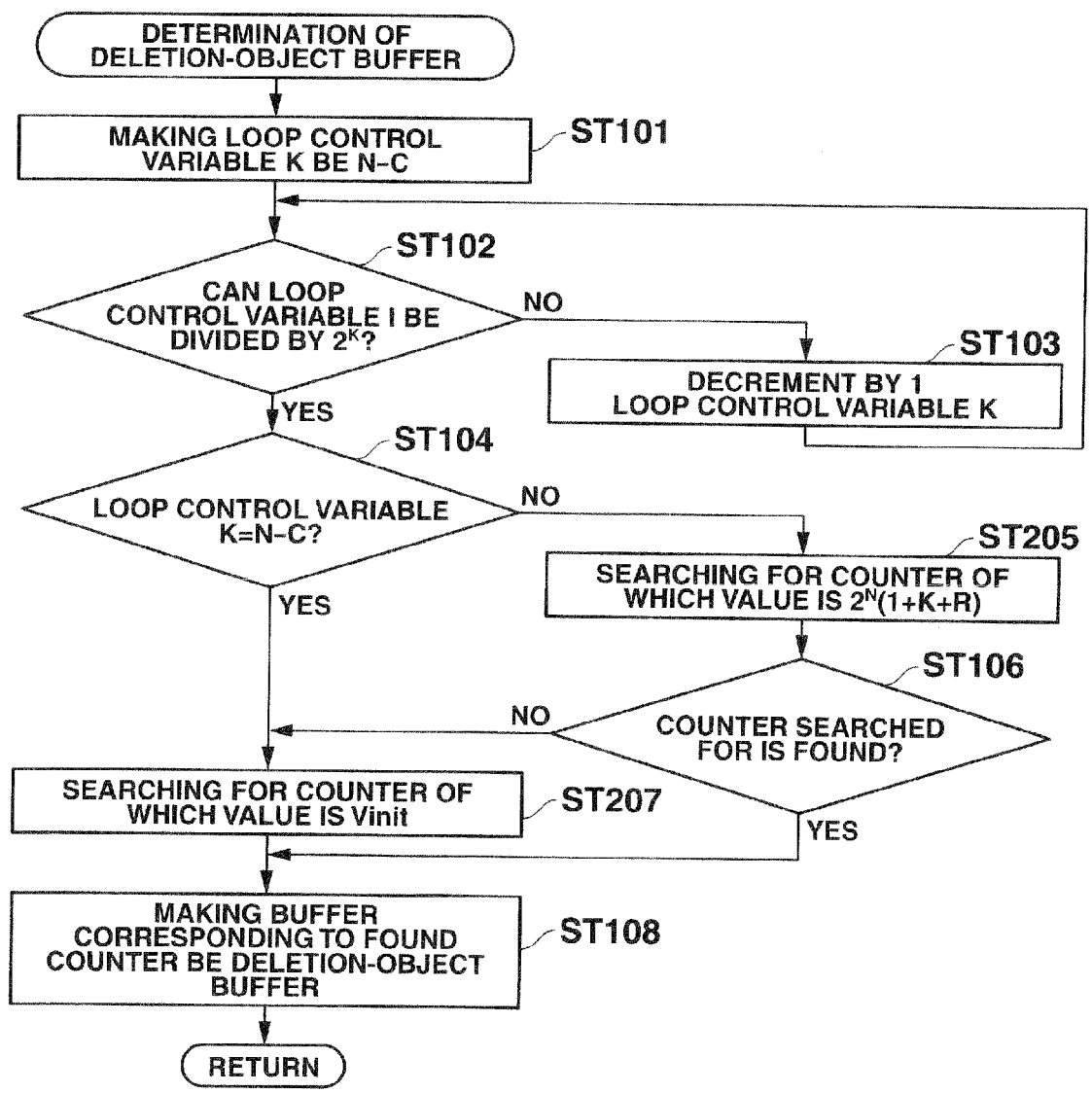
FIG. 12 illustrates a flow chart of a deletion object buffer selecting program according to the second embodiment of the present invention.

FIG. 11 and FIG. 12 illustrate an example of a flow chart of a program according to the second embodiment of the present invention. FIG. 11 and FIG. 12 are almost the same as FIG. 6 and FIG. 7 respectively which are the flow charts of the program according to the first embodiment of the present invention. In FIG. 11 and FIG. 6, and in FIG. 12 and FIG. 7, the same step number is given to the same step, respectively.

In the second embodiment, in Step ST24, the CPU 3 initializes the values of all the counters to Vinit computed by the equation (2) unlike the first embodiment. In Step ST29, the CPU 3 increments by 1 the values of all the counters of which the value are other than Vinit. In Step ST32, the CPU 3 sets up the initial value 0 in the counter corresponding to the buffer in which the image data has been stored. In Step ST205, the CPU 3 searches for the counter of which the value is $2^N \times (1+K+R)$. In Step ST207, the CPU 3 searches for the counter of which the value is Vinit.

In the example of FIG. 10, the value of the counter corresponding to the buffer selected as the deletion-object buffer repeats 9→17→9→33 as the flow charts of FIG. 11 and FIG. 12 show.

In each embodiment mentioned above, the image data which the image sensor control part 2 read has been stored in the buffer of the memory part 4, but the image data after processing in the image-processing part 7, and the image data after JPEG-compressing may be stored.

In each embodiment mentioned above, the image data imaged newly has been stored in the buffer selected as the deletion-object buffer, but it is also possible for the image data imaged newly to be stored in buffers other than the deletion-object buffer. For example, when the number of the buffer and the counter is made to be more than the number of pieces of image data to be recorded: M computed by the above-mentioned equation (i), two or more buffers in which the image data has been deleted will exist. In this case, as long as these are the buffers in which the deletion of the image data has been completed, the image data imaged newly may be stored in any buffer thereof.

In each embodiment mentioned above, although the imaging start is judged based on the detection of the half shutter state, the imaging start can be made to be judged after a specified time after the power-on of the camera, and also can be made to be judged after several frames after the half shutter state was detected. Similarly, also about the judgment of the imaging completion, any kind of method may be used for the imaging completion judgment such as a method other than the shutter full press and a method in which the imaging completion is judged in the case of detecting a change in the image or audio.

In each embodiment mentioned above, the value of the counter has been calculated by using the loop control variable K in the flow of "selection of deletion-object buffer" in FIG. 7 and FIG. 12. However, if the value of N, C, P, and R is known, the value of the counter corresponding to the deletion-object buffer can be computed. Then, the value of the counter corresponding to the deletion-object buffer may be computed in advance and stored.

Although the value of the counter has been decremented by one by one Vinit to 0 in the first embodiment, the value of the counter may be decremented by S from {(Vinit+X)×S} to Z with introducing an arbitrary number Z=X×S, for example. In this case, {(Vinit+X)×S} is set as the initial value in the counter corresponding to the buffer in which the image data imaged newly is stored.

Similarly, although the value of the counter has been incremented by one by one 0 to Vinit in the second embodiment, the value of the counter may be incremented by S from Z to {(Vinit+X)×S} with introducing an arbitrary number Z=X×S, for example. In this case, Z is set as the initial value in the counter corresponding to the buffer in which the image data imaged newly is stored, Thus, in the embodiment of the present invention, in the case of storing the image data imaged newly in the buffer, the initial value calculated based on the variable N, C, P and R is set in the counter. Thereby, the relative time information can be calculated based on the value of the counter. Accordingly, it becomes unnecessary to store the time information, and a circuit structure is reduced, and software becomes simple.

In each embodiment mentioned above, the required number of the buffer in the thinning continuous-imaging has been formulized as the equation (1). In each embodiment mentioned above, in the process in which the imaged image data is in progress of being stored in the buffer, one by one, the thinning of the image data has been performed by deleting the image data stored in the deletion-object buffer before (for example, the time point when the value of the counter has become to be "24" or "16") the elapsing of the longest time (the time frame in which the value of the counter changes from the initial value "Vinit" to "0" in the first embodiment) in which the buffer can hold the image data. Thereby the buffer capacity can be reduced because it becomes unnecessary to perform the thinning after having made the buffer hold once all the imaged image data, and because what is necessary is just to prepare even the minimum buffer capacity in which the image data after thinning, i.e. the image data to be recorded finally in the recording medium 6 (the image data corresponding to the number of pieces of image data to be recorded M) can be stored. And in each embodiment mentioned above, the buffer capacity (the number of the buffer) can be arbitrarily set up based on the variable N, C, P and R.

In each embodiment mentioned above, the basic number of pieces of thinning continuous-imaging is determined based on the variable N and C. And the value of the minimum frame rate of the thinning continuous-imaging and the number of pieces of image data to be recorded at the minimum frame rate can be changed based on the variable C. The number of pieces of image data to be recorded by the highest frame rate and the minimum frame rate of the thinning continuous-imaging can be increased arbitrarily based on the variables R and P.

Thus, in the embodiment of the present invention, the initial value Vinit of the value of the counter can be changed by adjusting the value of the variable N, C, P and R. Since this initial value Vinit specifies the time frame in which the image data can be recorded in the recording medium 6, in other words by adjusting the value of the variable N, C, P and R, the time frame in which the image data can be recorded in the recording medium 6 can be adjusted.

Thereby, the present invention can be easily applied in various applications now.

And in each embodiment mentioned above, the selection rule of the deletion-object buffer has been clarified. If this rule is followed, whenever the image data is imaged newly, one deletion-object buffer can be selected. Therefore, the process for the thinning continuous-imaging becomes the process repeating "deletion-object buffer selection→image data recording", and becomes simple thereby.

As mentioned above, although the embodiments of the present invention have been described, it should be understood that various amendments and combinations which are needed by design conditions or other factors, are included in the invention described in the claim or the scope of the invention corresponding to the example described in the embodiments of the invention.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2008-69627 filed on Mar. 18, 2008, and including specification, claims, drawings and summary. The specification, claims, and all drawings of the above Japanese Patent Application No. 2008-69627 are incorporated herein by reference in its entirety.

What is claimed is:

1. An imaging apparatus comprising:

an imaging unit which sequentially outputs frame image data at given time intervals;

a buffer which has a plurality of areas that temporarily hold a given plurality of frames of image data output from the imaging unit; and an imaging instruction unit which gives imaging instructions;

wherein the imaging apparatus transfers to and stores in a recording medium the plurality of frames of image data held in the buffer that are not thinned when an imaging instruction is given by the imaging instruction unit; and wherein the imaging apparatus further comprises:

a deleting unit which deletes frame image data in the buffer in a manner such that some frame image data that is deleted is newer than other frame image data that is held, such that older frame image data is thinned at a higher thinning rate, and such that newest frame image data output from the imaging unit is held regardless of a size of free area in the buffer, wherein the deleting unit performs two types of deletions including a first deletion type which is a newer frame image data thinning deletion in which some frame image data that is deleted is newer than other frame image data that is held, and a second deletion type which is an older frame image data thinning deletion in which some frame image data that is deleted is older than other frame image data that is held, and wherein the deleting unit deletes the frame image data by periodically performing the two types of deletions such that the older frame image data is thinned more frequently than the newer frame image data; and a writing unit which writes the newest frame image data in the area where the frame image data deleted by the deleting unit had been held.

2. The imaging apparatus according to claim 1, wherein the thinning rate of frame image data deleted by the deleting unit has a fixed upper limit and lower limit, and a transition between the upper and lower limits can be determined by a user on an arbitrary basis.

3. The imaging apparatus according to claim 1, wherein the deleting unit operates in synchronization with the frame image data output intervals of the imaging unit and does not delete a plurality of frame image data in one operation.

4. The imaging apparatus according to claim 1, further comprising a counter indicating a chronological order of frame image data held in the areas of the buffer, wherein a content of the counter is updated each time the newest frame image data is held in the buffer.

5. An imaging method for an imaging apparatus comprising:

an imaging unit which sequentially outputs frame image data at given time intervals;

a buffer which has a plurality of areas that temporarily hold a given plurality of frames of image data output from the imaging unit; and an imaging instruction unit which gives imaging instructions;

wherein the imaging apparatus transfers to and stores in a recording medium the plurality of frames of image data held in the buffer that are not thinned when an imaging instruction is given by the imaging instruction unit, the imaging method comprising:

deleting frame image data in the buffer in a manner such that older frame image data is thinned at a higher thinning rate, such that some frame image data that is deleted is newer than other frame image data that is held, and such that newest frame image data output from the imaging unit is held regardless of a size of free area in the buffer, wherein the frame image data is deleted by performing two types of deletions including a first deletion type which is a newer frame image data thinning deletion in which some frame image data that is deleted is newer than other frame image data that is held, and a second deletion type which is an older frame image data thinning deletion in which some frame image data that is deleted is older than other frame image data that is held, and wherein the frame image data is deleted by periodically performing the two types of deletions such that the older frame image data is thinned more frequently than the newer frame image data; and writing the newest frame image data in the area where the deleted frame image data had been held.

6. A non-transitory computer-readable recording medium storing an imaging program for controlling a computer of an imaging apparatus comprising:

an imaging unit which sequentially outputs frame image data at given time intervals;

a buffer which has a plurality of areas that temporarily hold a given plurality of frames of image data output from the imaging unit; and an imaging instruction unit which gives imaging instructions;

wherein the imaging apparatus transfers to and stores in a recording medium the plurality of frames of image data held in the buffer that are not thinned when an imaging instruction is given by the imaging instruction unit, wherein the program is executable to control the computer to function as elements including:

a deleting unit which deletes frame image data in the buffer in a manner such that older frame image data is thinned at a higher thinning rate, such that some frame image data that is deleted is newer than other frame image data that is held, and such that newest frame image data output from the imaging unit is held regardless of a size of free area in the buffer, wherein the deleting unit performs two types of deletions including a first deletion type which is a newer frame image data thinning deletion in which some frame image data that is deleted is newer than other frame image data that is held, and a second deletion type which is an older frame image data thinning deletion in which some frame image data that is deleted is older than other frame image data that is held, and wherein the deleting unit deletes the frame image data by periodically Performing the two types of deletions such that the older frame image data is thinned more frequently than the newer frame image data; and a writing unit which writes the newest frame image data in the area where the frame image data deleted by the deleting unit had been held.

* * * * *